United States Patent [19]
Donnelly

[11] Patent Number: 5,640,747
[45] Date of Patent: Jun. 24, 1997

[54] CURTAIN APPARATUS

[76] Inventor: James N. Donnelly, 4622 N. 525 W., LaPorte, Ind. 46350

[21] Appl. No.: 551,105

[22] Filed: Oct. 31, 1995

Related U.S. Application Data

[63] Continuation-in-part of Ser. No. 319,284, Oct. 6, 1994, Pat. No. 5,461,763, which is a continuation-in-part of Ser. No. 132,763, Oct. 6, 1993, Pat. No. 5,357,664.

[51] Int. Cl.$^6$ .................. B21C 43/00; E16P 1/00
[52] U.S. Cl. .................. 29/81.08; 29/DIG. 94; 72/483; 74/608; 409/134; 432/250
[58] Field of Search .................. 29/33 Q, 33 S, 29/DIG. 94, DIG. 50, DIG. 86, 81.06, 81.07, 81.08; 409/134; 432/250; 74/608; 451/451; 72/38, 39, 483; 144/251 R, 252 R

[56] References Cited

U.S. PATENT DOCUMENTS

| | | | |
|---|---|---|---|
| 3,848,721 | 11/1974 | Smit | 74/608 X |
| 3,965,523 | 6/1976 | Elliott | 15/302 |
| 4,867,677 | 9/1989 | Ulinski | 432/250 X |
| 4,918,959 | 4/1990 | Parazak et al. | 72/39 |
| 5,272,798 | 12/1993 | Cole et al. | 29/81.08 |
| 5,310,338 | 5/1994 | Harding | 432/250 X |

FOREIGN PATENT DOCUMENTS

| | | |
|---|---|---|
| 2405450 | 5/1979 | France. |
| 2554366 | 5/1985 | France. |
| 756049 | 10/1951 | Germany. |
| 178312 | 7/1989 | Japan. |
| 5177242 | 7/1993 | Japan. |

OTHER PUBLICATIONS

Quotation dated Jan. 28, 1991, from RGS Mill Products Corp. to LTV Steel/Indiana Harbor Works, (11 pages).

Quotation dated Mar. 10, 1992, from RGS Mill Products Corp. to California Steel Industries, Inc., (8 pages).

W. Herold, "Méthode de dimensionnement d'une installation de décalaminage," La Métallurgie, vol. 102, No. 7, Jul. 1970, pp. 389–398.

*Primary Examiner*—William R. Briggs
*Attorney, Agent, or Firm*—Speckman, Pauley & Fejer

[57] ABSTRACT

A curtain apparatus having a hood with a top plate in which one or more slots and/or openings are positioned, such as approximately parallel to each other. A fixed woven mesh metal curtain is mounted within one slot or opening so that the fixed woven mesh metal curtain remains in a fixed position with respect to the top plate, during operation of a descaler. A moveable woven mesh metal curtain can be mounted within the same or another slot or opening so that during operation of the descaler, the moveable woven mesh metal curtain translates along a longitudinal axis of the slot or the opening.

11 Claims, 11 Drawing Sheets

CURTAIN APPARATUS

CROSS REFERENCE TO RELATED APPLICATIONS

This application is a continuation-in-part application of my patent application having Ser. No. 08/319,284, filed 6 Oct. 1994, U.S. Pat. No. 5,461,763, which is a continuation-in-part of my prior patent application having Ser. No. 08/132,763, filed 6 Oct. 1993, which issued as U.S. Pat. No. 5,357,664, on 25 Oct. 1994.

BACKGROUND OF THE INVENTION

1. Field of the Invention

This invention relates to a curtain apparatus which includes one or more fixed woven mesh metal curtains and/or one or more moveable woven mesh metal curtains mounted within at least one slot and/or at least one opening contained in a top plate of a hood structure, such as of an industrial furnace.

2. Description of Prior Art

Steel woven mesh curtains have been used to cover openings of descalers used in steel mills for the purpose of preventing scale, slag and other undesirable debris from discharging through an opening, a hood or other cover structure of the descaler. In a descaling operation, high-pressure sprays are used to remove scale from bars, rods, strips and the like being processed. In a descaling operation, moisture is introduced between work rolls and stock so that the moisture vaporizes instantaneously with explosive effects for removing scale. High-pressure sprays, which impinge on both the top and bottom surfaces of a slab, are applied at pressures of as much as 3000 psi. The continuous hot-strip mill method of removing scale has been adopted for plate-mill methods. Thus, due to the relatively great pressures and explosive effects, scale is discharged at a very high acceleration and velocity toward an opening of a descaler. Thus, it is apparent that there is a need for a curtain apparatus that can withstand the forces created by water, scale particles and other pieces flying at such high accelerations and velocities.

Conventional curtain assemblies use woven mesh curtains, chains or plates, all typically constructed of strong materials, such as a variety of stainless steels or high-carbon steel. It is known that woven mesh metal curtains are constructed of fabrics comprising alternating left-hand and right-hand spirals of metal nested together and joined by three or more straight connecting rods. Conventional curtain apparatuses use curtains which are fixedly attached to an inside surface of a descaler hood or other cover structure, and use other curtains which are secured to moveable guide arms of the descaler or other milling apparatus. However, such moving curtains are pinned, welded or bolted to such guide arms, thus requiring extensive labor and shutdown periods for installation and removal.

Other conventional curtain apparatuses include a moveable curtain installed within a slot of the hood. However, such moving curtains are also pinned, welded or bolted to a bracket on the moveable guide arm, thus requiring entry into the hood for repair or removal of the curtains.

It is apparent that conventional curtain apparatuses require shutdown of the milling operation in order to install, remove or maintain either moveable or fixed curtains. Thus, it is apparent that there is a need for a curtain apparatus which can be easily removed, maintained and installed from outside of the hood or other equivalent cover structure.

SUMMARY OF THE INVENTION

It is one object of this invention to provide a curtain apparatus having at least one fixed woven mesh metal curtain which is mounted within a slot or another suitable opening of a top plate and which can be easily removed and installed from above or outside a hood structure.

It is another object of this invention to provide a curtain apparatus having at least one moveable woven mesh metal curtain which is mounted within a slot of a top plate, whereby the moveable woven mesh metal curtain can be adjusted to accommodate differently sized bars or slabs passing through a descaler.

It is another object of this invention to provide a curtain apparatus having a moveable woven mesh metal curtain that detachably engages with a mover bracket secured to a moveable guide arm of a milling apparatus.

It is still another object of this invention to provide at least one moveable curtain that follows movements of a moveable guide arm without being fixedly attached or otherwise secured with respect to the moveable guide arm.

It is yet another object of this invention to provide a curtain apparatus having at least one fixed curtain that is secured with respect to a top plate that can be easily removed from the hood.

The above and other objects of this invention are accomplished with a curtain apparatus including a hood with a top plate. The top plate preferably has either a plurality of slots arranged approximately parallel to each other or another suitable opening that accommodates fixed mesh metal curtains. At least one fixed woven mesh metal curtain is removably mounted within a corresponding slot or opening so that the fixed woven mesh metal curtain remains in a fixed position with respect to the top plate, for example during operation of a descaler. A moveable woven mesh metal curtain can be mounted within another slot or opening such that the moveable woven mesh metal curtain can move along a longitudinal axis of the slot or within the opening, for example during operation of a descaler when a moveable guide arm is repositioned to accommodate a different width of a mill stock. In one preferred embodiment of this invention, a mover bracket is attached to the moveable guide arm in such a fashion that the mover bracket is detachably engageable with respect to a receiver secured to the moveable woven mesh metal curtain. In another preferred embodiment of this invention, the moveable curtain is not secured or otherwise attached to the moveable guide arm but rather is guided between receiver plates secured with respect to the moveable guide arm.

In one preferred embodiment according to this invention, the fixed woven mesh metal curtain is mounted within a corresponding slot by using a stop bracket that is secured to a top portion of the fixed woven mesh metal curtain. In a mounted position, the stop bracket abuts the top plate of the hood. The stop bracket is preferably constructed of an elongated angle bracket having one side attached to the top portion of the fixed woven mesh metal curtain and another side abutting the top plate.

In another preferred embodiment according to this invention, the fixed woven mesh metal curtain is mounted to a bracket which is secured with respect to a mounting plate. The mounting plate is preferably removably mounted upon the top plate of the hood. In such preferred embodiment, the hood has an opening the accepts one or more fixed woven mesh metal curtains within the hood structure.

In one preferred embodiment according to this invention, roller assemblies are attached to the top portion of the moveable woven mesh metal curtain, so that the curtain can translate or move along a longitudinal axis of the slot. Each roller assembly preferably comprises at least two wheels rotatably mounted on each face of the moveable woven mesh metal curtain. The moveable curtain can be urged into either an open position or a closed position by using a weight and pulley system.

In another preferred embodiment of this invention, a plurality of fixed woven mesh metal curtains and a plurality of moveable woven mesh metal curtains are suspended from the mounting plate or the top plate of the hood so as to form a baffle for stopping discharged water, scale pieces or other foreign materials. As more curtains are used, it becomes more apparent that easy installation and removal of the curtains is necessary for efficient and cost-saving operation of a descaler. Furthermore, in the event of a cobble or crash on the roll line, where it is necessary to lift the hood structure to remove the cobble, there is a need for a quick and easy detachment of moving curtains from moveable guide arms.

DESCRIPTION OF PREFERRED EMBODIMENTS

Figure 1:
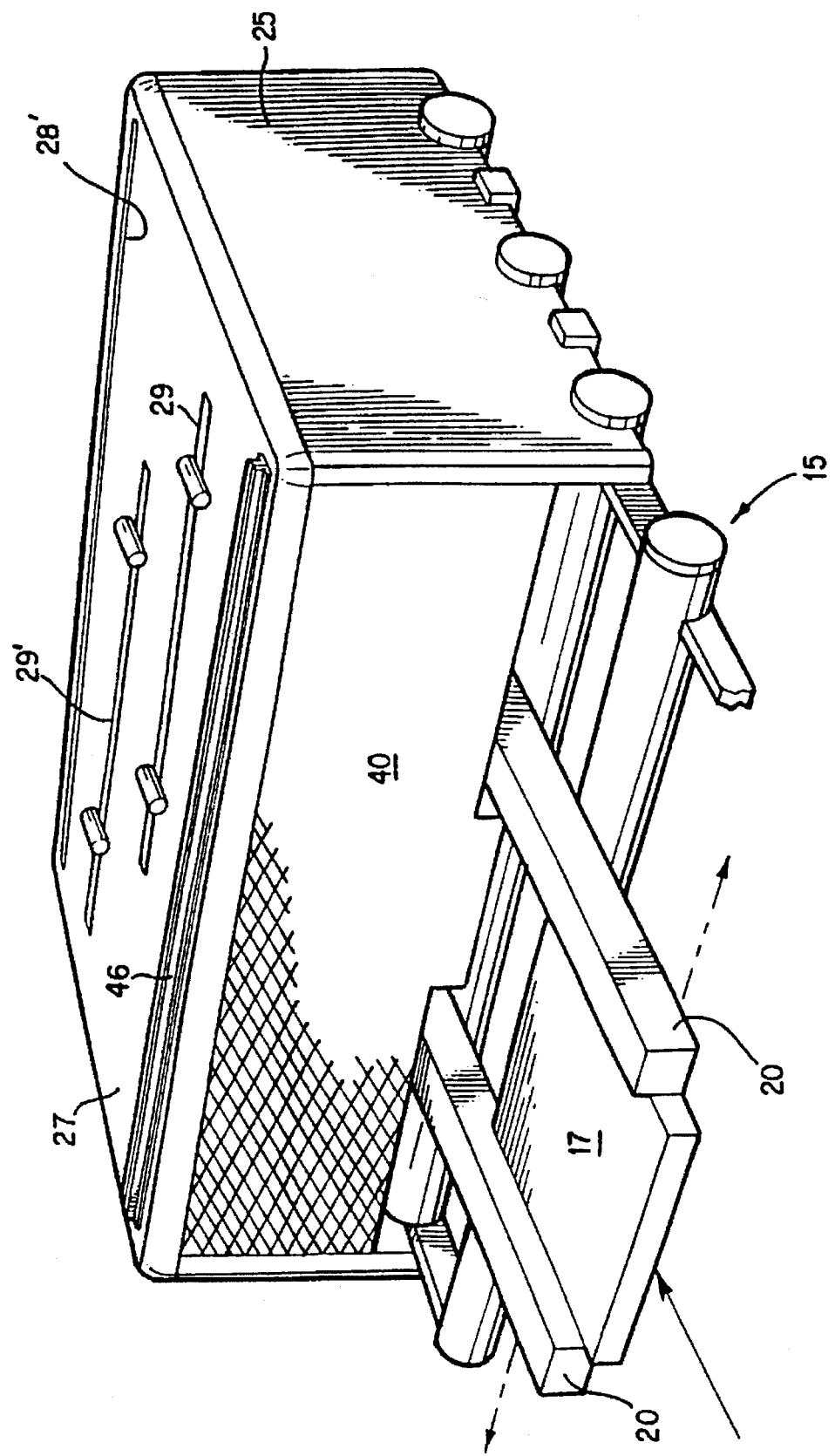
FIG. 1 is a perspective view of a hood assembly mounted over a conveyer charging stock into a descaler, according to one preferred embodiment of this invention.
Figure 2:
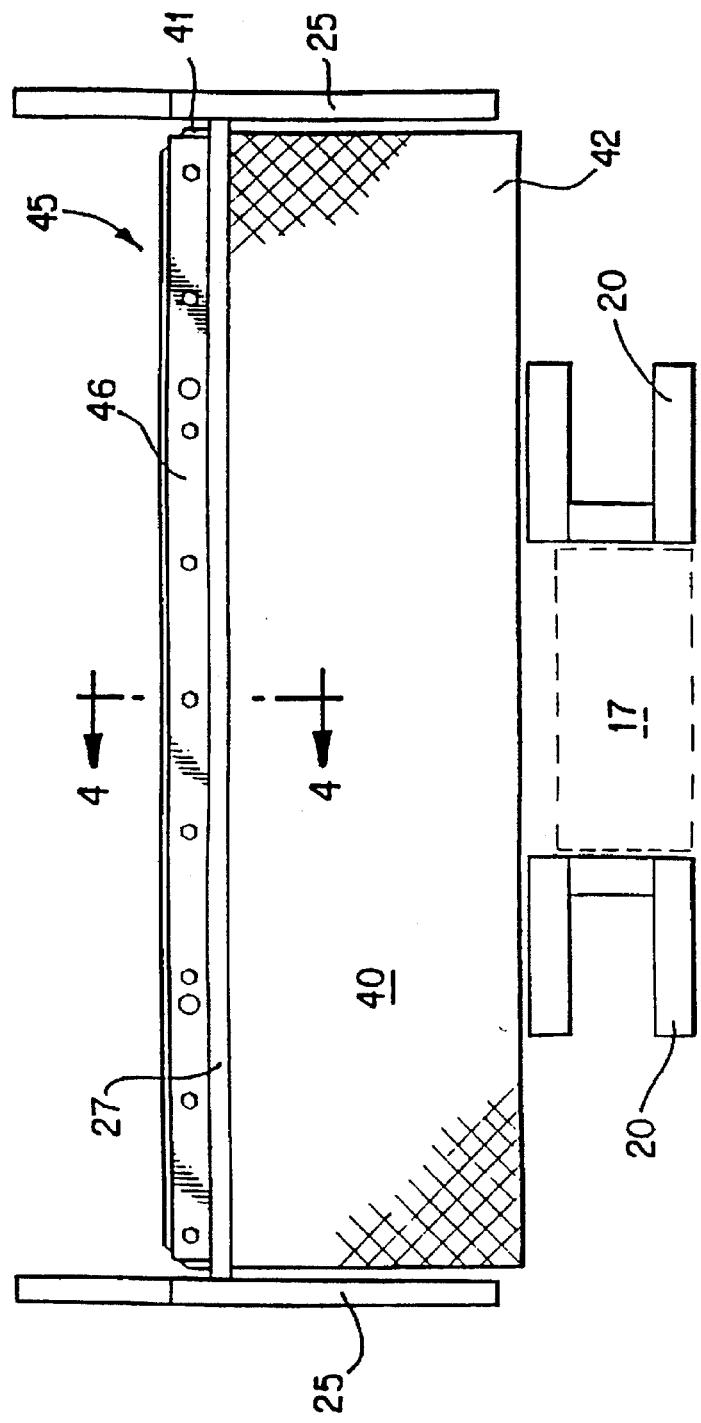
FIG. 2 is a front view of a fixed woven mesh metal curtain mounted within a slot of a top plate of the hood shown in FIG. 1.

Referring to FIG. 1, milling apparatus 15 is shown in a perspective view of one preferred embodiment according to this invention. Mill stock 17 rides on rollers of the conveyer system and is charged from hood 25 in the direction of the solid arrow shown in FIGS. 1 and 6. As shown in FIG. 1, moveable woven mesh metal curtains are mounted within slots 29. FIG. 1 shows hood 25 having top plate 27. It is apparent that various shapes and sizes of hood 25 and top plate 27 can be used without departing from the results obtained from this invention. For example, FIG. 2 shows another preferred embodiment of hood 25 and top plate 27. The particular shape and size, as well as materials, for hood 25 can vary according to the particular application of hood 25.

As shown in FIG. 1, mill stock 17 is a slab or bar of material, preferably steel which is formed in a plate mill, a hot strip mill, or a bar and rod mill.

Figure 17:
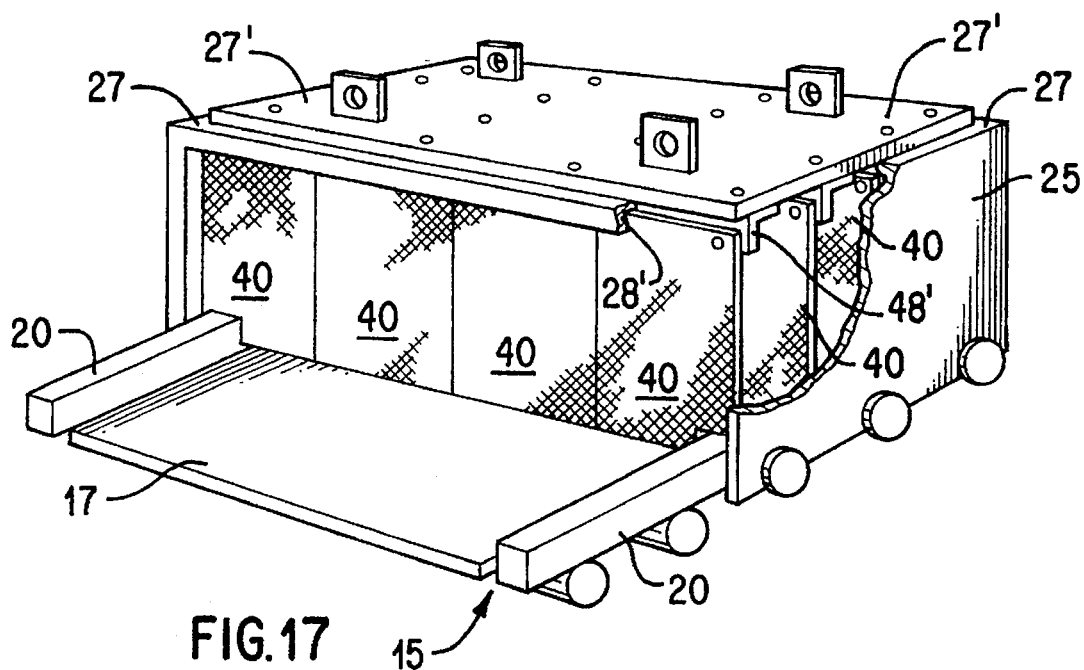
FIG. 17 is a perspective view of a hood assembly mounted over a conveyor charging stock into a descaler, wherein a corner portion of the hood is cutaway, according to another preferred embodiment of this invention.

Conventional milling apparatuses include moveable guide arms 20 which are preferably mounted in an adjustable position so that they can move toward each other or away from each other, depending upon the particular width of mill stock 17 running through milling apparatus 15. For example, if the milling operation changes to require a run of wider mill stock 17 than that as shown in FIG. 1, moveable guide arms 20 move in a horizontal direction away from each, as indicated by the dashed arrows shown in FIG. 1. Likewise, if the milling operation is changed to run narrower mill stock 17, then moveable guide arms 20 are moved towards each other. If the width of mill stock 17 remains constant, then fixed guide arms 20, for example as shown in FIG. 17, can be used to guide mill stock 17.

With the variable settings of moveable guide arms 20, it is necessary to have a curtain that prevents water, scale, slag and other foreign particles or pieces of material from discharging outside of hood 25. According to this invention, multiple rows of fixed woven mesh metal curtains 40 and/or moveable woven mesh metal curtains 50 are used to act as baffle means for preventing water, scale and slag from discharging outside of hood 25 by way of the opening through which mill stock 17 runs. Even though conventional curtains are made of relatively heavy woven mesh material, chains or plates, due to the extreme velocities and accelerations of water, scale particles or relatively large pieces of such foreign matter cannot be confined by a single woven mesh metal curtain. Thus, according to one preferred embodiment of this invention, multiple woven mesh metal curtains are used to act as a baffle with spacing between adjacent rows for decelerating the water, scale particles and other foreign objects.

Many conventional milling apparatuses are designed to remove such scale pieces and particles by way of conveyers, screw pumps and the like which are mounted in a pit beneath the rollers of the conveyer. Because the scale particles from a descaling operation, for example, can collect in relatively large piles within a relatively short time, there is a definite advantage to containing the scale particles within hood 25 and allowing them to fall into a pit below the roll line to be conveyed, transferred or flumed to conveyers, screw pumps and the like for easy removal. One significant advantage of this invention is the baffle effect resulting from spaced rows of fixed woven mesh metal curtains and/or moveable woven mesh metal curtains, resulting in water, scale and other foreign materials being directed into the pit below the roll line for recycling of the water and separation of the scale for further processing.

Figure 6:
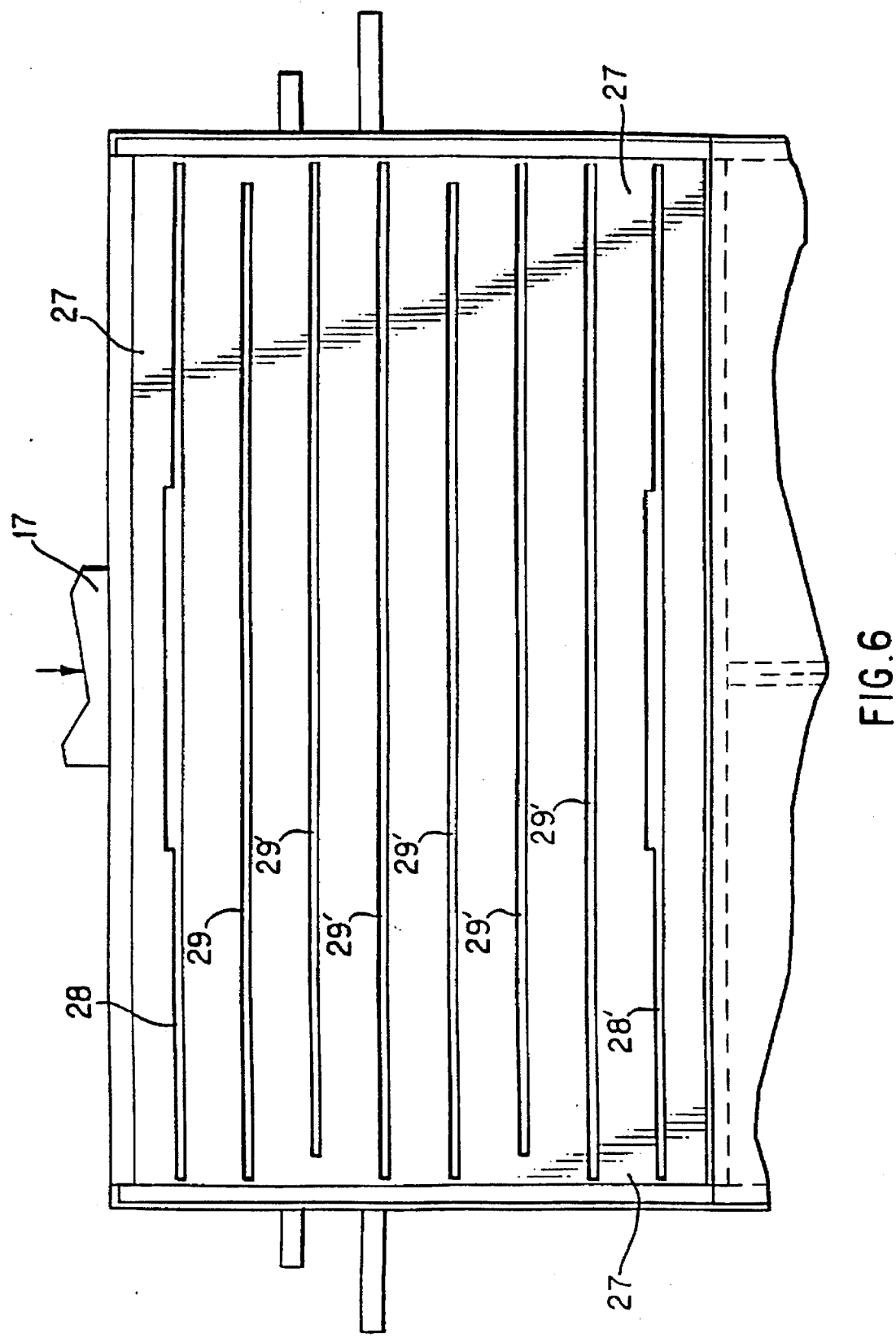
FIG. 6 is a top view of a top plate having eight slots, according to one preferred embodiment of this invention.

According to one preferred embodiment of this invention, hood 25 comprises top plate 27, as shown in FIG. 6. Slots 28, 28' preferably accommodate fixed woven mesh metal curtains 40 whereas slots 29, 29' preferably accommodate moveable woven mesh metal curtains 50. Depending upon the particular application for this invention, one or more slots 28, 28' can be used and one or more slots 29, 29' can be used. For example, it is more advantageous to have several rows of fixed woven mesh metal curtains 40 and several rows of moveable woven mesh metal curtains 50 with spacing between adjacent rows, as shown in FIG. 6, so that the multiple woven mesh metal curtains act as a baffle for containing scale particles within hood 25. It is also apparent that slots 28, 28' and slots 29, 29' may accommodate all fixed woven mesh metal curtains 40 or all moveable woven mesh metal curtains 50.

Fixed woven mesh metal curtains 40 and moveable woven mesh metal curtains 50 are installed by lowering the curtain into slot 28 or 29 from outside of hood 25. Thus, according to this invention it is not necessary to enter hood 25 in order to install, remove or maintain fixed woven mesh metal curtain 40 or moveable woven mesh metal curtain 50. This is particularly advantageous since such installation, removal or maintenance operation requires no entry into hood 25 by workers to disconnect otherwise conventional bolted or welded curtain members within a hood.

Figure 3:
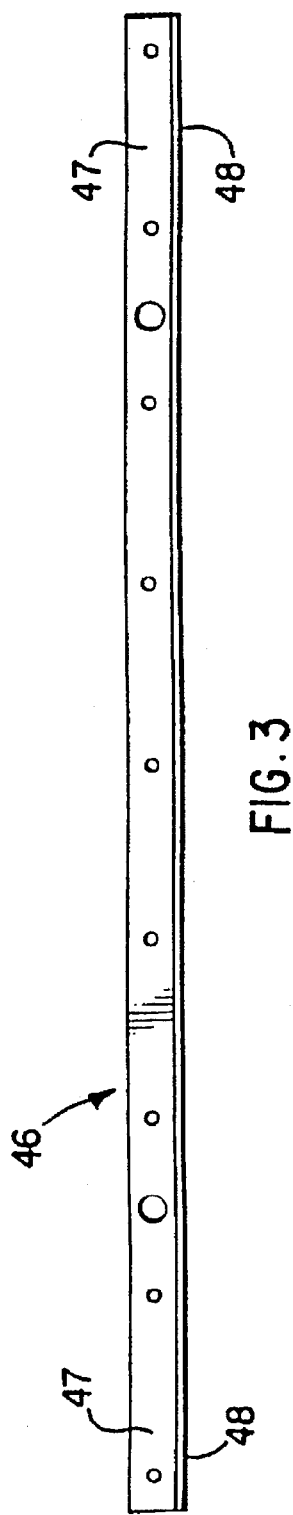
FIG. 3 is a front view of an angle bracket used to mount the fixed woven mesh metal curtain shown in FIG. 2.
Figure 14:
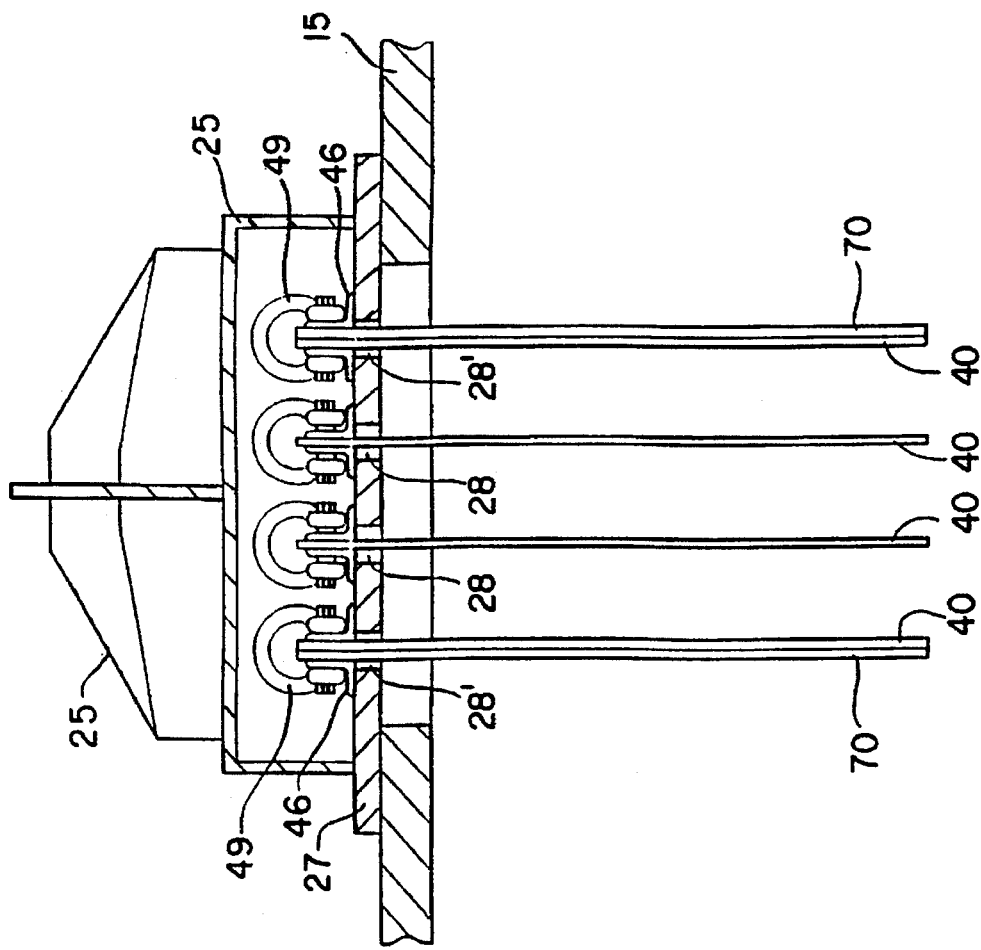
FIG. 14 is a partial cross-sectional view of four fixed woven mesh metal curtains mounted within four slots within a baseplate of a hood assembly.

FIG. 2 shows a front view of fixed woven mesh metal curtain 40 mounted in a suspended position within hood 25. Mounting means 45 are used to mount fixed woven mesh metal curtain 40 within slot 28 in a fixed position with respect to top plate 27. Stop bracket 46 is secured to a top portion of fixed woven mesh metal curtain 40, as shown in FIG. 2. FIG. 3 shows a front view of an elongated angle bracket which is one preferred embodiment of stop bracket 46. As shown in FIGS. 2 and 3, side 47 of stop bracket 46 is attached to top portion 41 of fixed woven mesh metal curtain 40 and side 48 abuts top plate 27 thereby preventing fixed woven mesh metal curtain 40 from dropping through slot 28. It is apparent that other configurations of angle iron or other brackets can be used in place of the angle bracket shown in FIGS. 2 and 3, in order to accomplish the same result of preventing fixed woven mesh metal curtain 40 from falling through slot 28 and into the interior space of hood 25. As shown in FIG. 14, shackle 49 or any other suitable structural element can be secured to stop bracket 46 as means for positioning fixed woven mesh metal curtain 40 into and out of slot 28, 28'.

Figure 18:
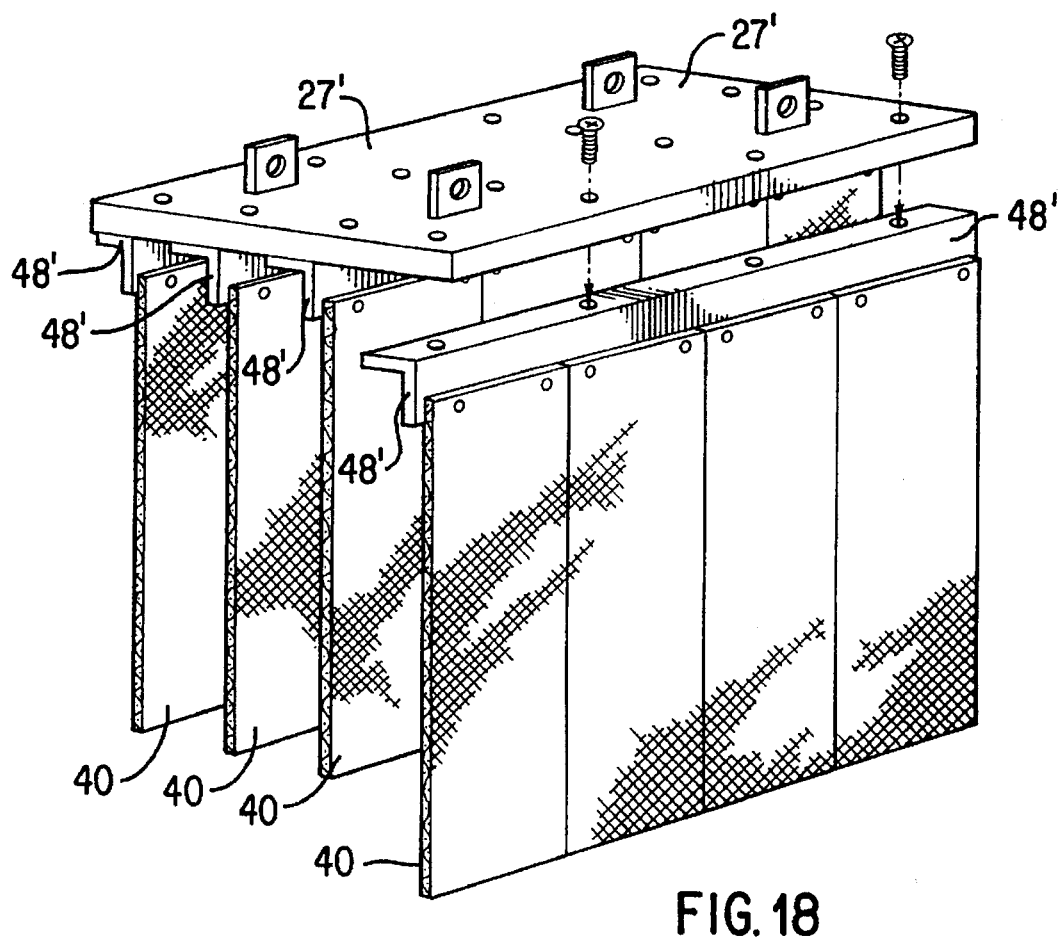
FIG. 18 is a perspective view of a mounting plate and four attached fixed woven mesh metal curtains, as shown in FIG. 17.

FIGS. 17 and 18 show still another preferred embodiment of this invention for suspending fixed woven mesh metal curtains 40 within hood 25. In such preferred embodiment, mounting means 45 are used to mount fixed woven mesh metal curtain 40 within opening 28' formed within top plate 27 or hood 25. Brackets 46' are preferably used to secure fixed woven mesh metal curtain 40 with respect to mounting plate 27'. It is apparent that any suitable fastening means, such as the threaded bolts shown in FIG. 18, a suitable weld, or any other suitable fastener can be used to secure bracket 46' with respect to mounting plate 27'. As shown in FIG. 17, the assembly of fixed woven mesh metal curtains 40, brackets 46' and mounting plate 27' can be positioned within opening 28'. It is apparent that opening 28' can have any shape that accommodates the fixed woven mesh metal curtains 40. As shown in FIGS. 17 and 18, lifting lugs or another suitable grasping means can be used to transfer a lifting force to mounting plate 27'.

Figure 5:
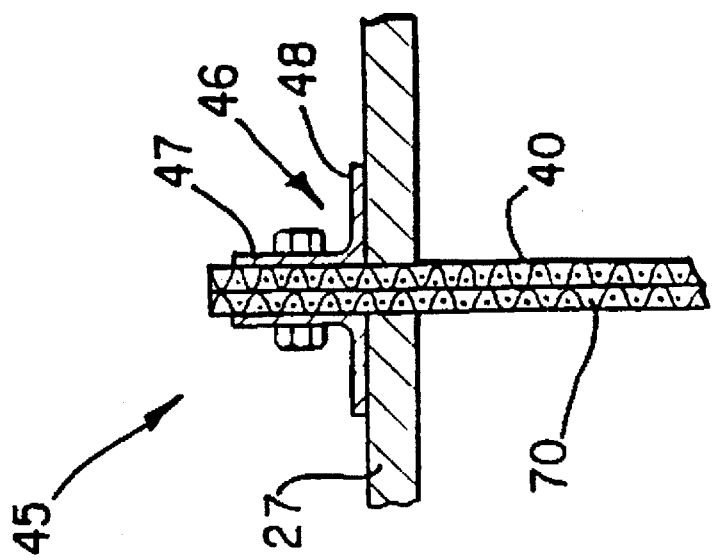
FIG. 5 is a cross-sectional view taken along line 5—5 as shown in FIG. 11, of two adjacent fixed woven mesh metal curtains mounted within a slot of a top plate, according to another preferred embodiment of this invention.
Figure 4:
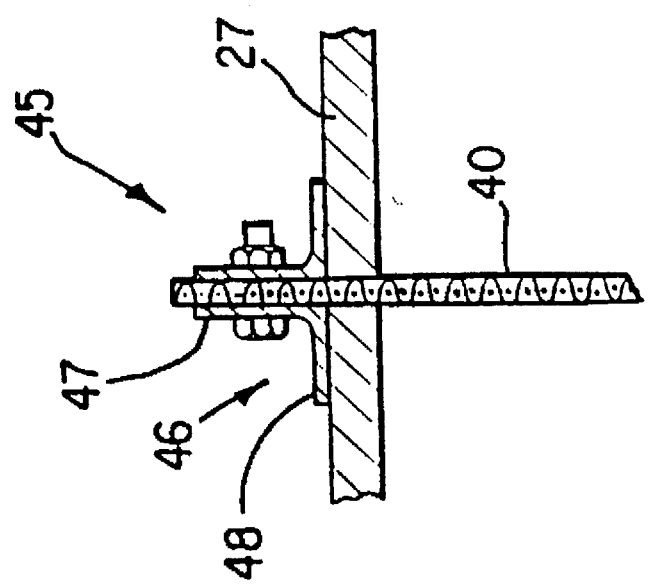
FIG. 4 is a cross-sectional side view of a single fixed woven mesh metal curtain mounted within a slot of the top plate, according to one preferred embodiment of this invention.

FIG. 4 shows a partial cross-sectional view, taken along line 4—4 of FIG. 2, of fixed woven mesh metal curtain 40 mounted in a suspended position within slot 28. FIG. 5 shows a partial cross-sectional view of a double curtain arrangement where slave woven mesh metal curtain 70 is suspended in a fixed position adjacent to fixed woven mesh metal curtain 40. As shown in FIG. 6, the two end slots 28, 28' accommodate the double curtain thickness arrangement shown in FIGS. 5 and 11. Slave woven mesh metal curtain 70 is used as additional baffle means, making it more difficult for scale pieces to exit hood 25. Also, slave woven mesh metal curtain 70 is used to prevent excessive wear on the main fixed woven mesh metal curtain 40 structure to which it is attached. FIG. 14 shows a partial cross-sectional view of four fixed woven mesh metal curtains 40, two having one slave woven mesh metal curtain 70, mounted within corresponding slots 28, 28'.

Figure 7:
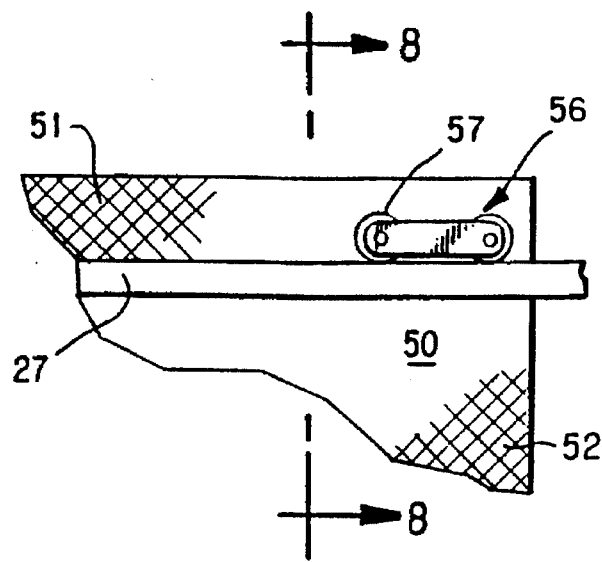
FIG. 7 is a partial side view of a roller assembly mounted to a top portion of a moveable woven mesh metal curtain, according to one preferred embodiment of this invention.
Figure 8:
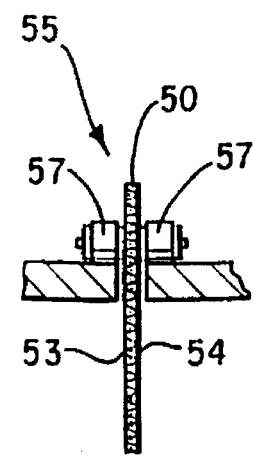
FIG. 8 is a cross-sectional view taken along line 8—8, as shown in FIG. 7, of the roller assembly mounted to the top portion of the moveable woven mesh metal curtain, as shown in FIG. 7.

As shown in FIGS. 7 and 8 and according to one preferred embodiment of this invention, mounting means 55 are used to mount moveable woven mesh metal curtain 50 within slot 29, 29' in an adjustable operating position with respect to top plate 27. The phrase "adjustable operating position" as used throughout this specification and in the claims is intended to relate to the mechanical structure of moveable woven mesh metal curtain 50 which allows it to move along a longitudinal axis of slot 29, 29' when mounted therein.

In one preferred embodiment according to this invention, mounting means 55 comprise roller assembly 56 having wheels 57 rotatably mounted with respect moveable woven mesh metal curtain 50. As shown in FIGS. 7 and 8, two rotatable wheels 57 of each roller assembly 56 are mounted on each of faces 53 and 54 of moveable woven mesh metal curtain 50. Each roller assembly 56 is preferably attached or secured to top portion 51 of moveable woven mesh metal curtain 50.

It is apparent that other suitable rotating or sliding assemblies can be used to accomplish the same result of allowing moveable woven mesh metal curtain 50 to translate or move along a longitudinal axis of slot 29, 29', particularly during movement of moveable guide arm 20.

Figure 9:
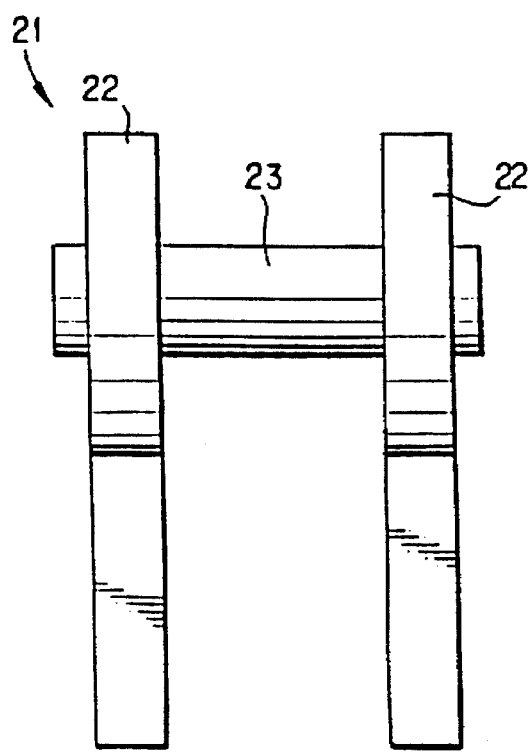
FIG. 9 is a front view of a mover bracket, according to one preferred embodiment of this invention.
Figure 10:
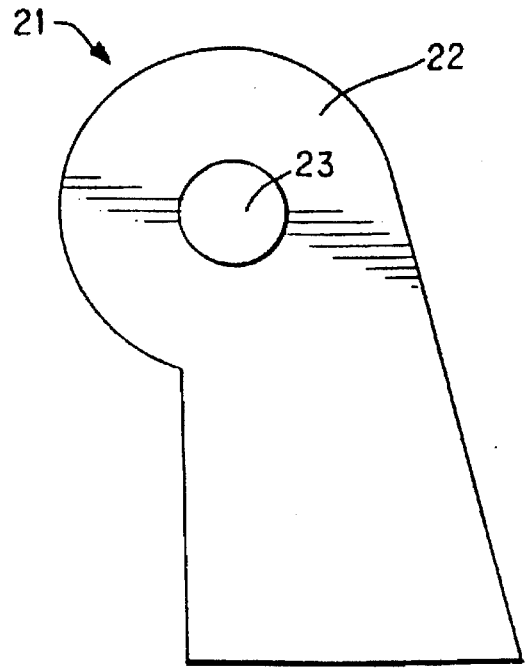
FIG. 10 is a side view of the mover bracket shown in FIG. 9.

Mover bracket 21, shown in FIGS. 9 and 10, preferably comprises two side arms 22 and rod 23 secured between both side arms 22. It is apparent that other mechanical structures can be used to accomplish the same result of providing a mechanical component for mating with receiver 62, shown in FIGS. 12 and 13.

In one preferred embodiment according to this invention, mover bracket 21 is secured to moveable guide arm 20 in any suitable matter. Engagement means 60 are used for detachably engaging moveable woven mesh metal curtain 50 with respect to mover bracket 21. In one preferred embodiment according to this invention, receiver 62, shown in FIGS. 12 and 13 as a plate having groove 63, is attached or secured to vertical face 53 and/or vertical face 54, shown in FIG. 8, of moveable woven mesh metal curtain 50. The plate of receiver 62 is primarily for the purpose of creating a rigid portion of the otherwise flexible woven mesh of moveable woven mesh metal curtain 50. Fixed woven mesh metal curtain 40 and moveable woven mesh metal curtain 50 according to this invention are preferably constructed of woven mesh metal curtain material comprising alternating left-hand and right-hand spirals of metal nested together and joined by three or more straight connecting rods. The phrase "woven mesh metal curtain" as used throughout the specification and in the claims is intended to relate to such material.

Figure 12:
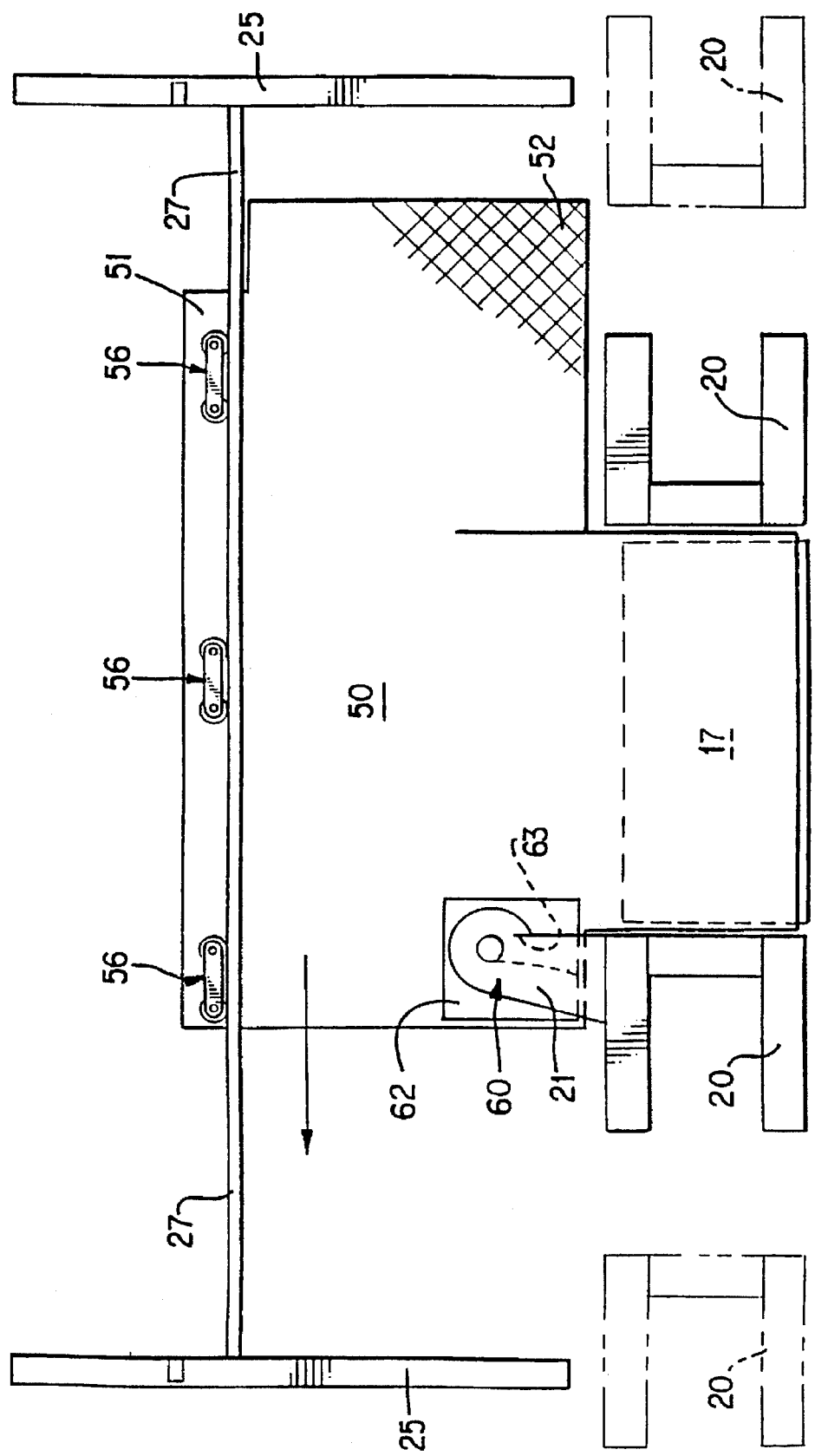
FIG. 12 is a front view of a moveable woven mesh metal curtain attached to one side of a moveable guide arm, according to one preferred embodiment of this invention.
Figure 13:
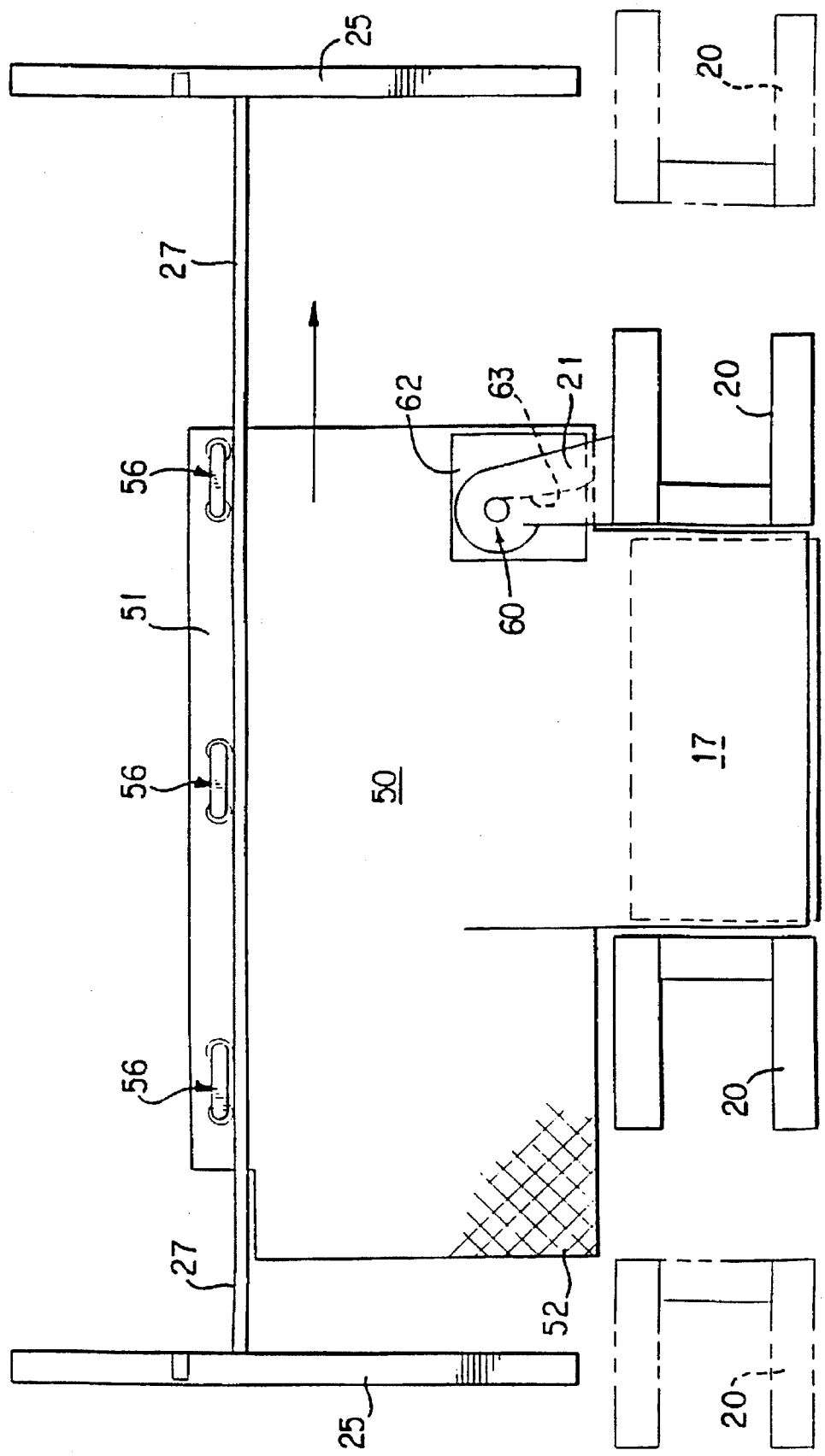
FIG. 13 is a front view of a moveable woven mesh metal curtain attached to the opposite side of the moveable guide arm, with respect to the view shown in FIG. 12, according to one preferred embodiment of this invention.

As shown in FIGS. 12 and 13, rod 23 detachably engages with groove 63 when moveable woven mesh metal curtain 50 is lowered far enough into the interior of hood 25. With each moveable woven mesh metal curtain 50 detachably engaged with respect to a corresponding guide arm 20, moveable woven mesh metal curtain 50 can translate or move along a longitudinal axis of slot 29, 29', in the direction of the arrows as shown in FIGS. 12 and 13.

Figure 11:
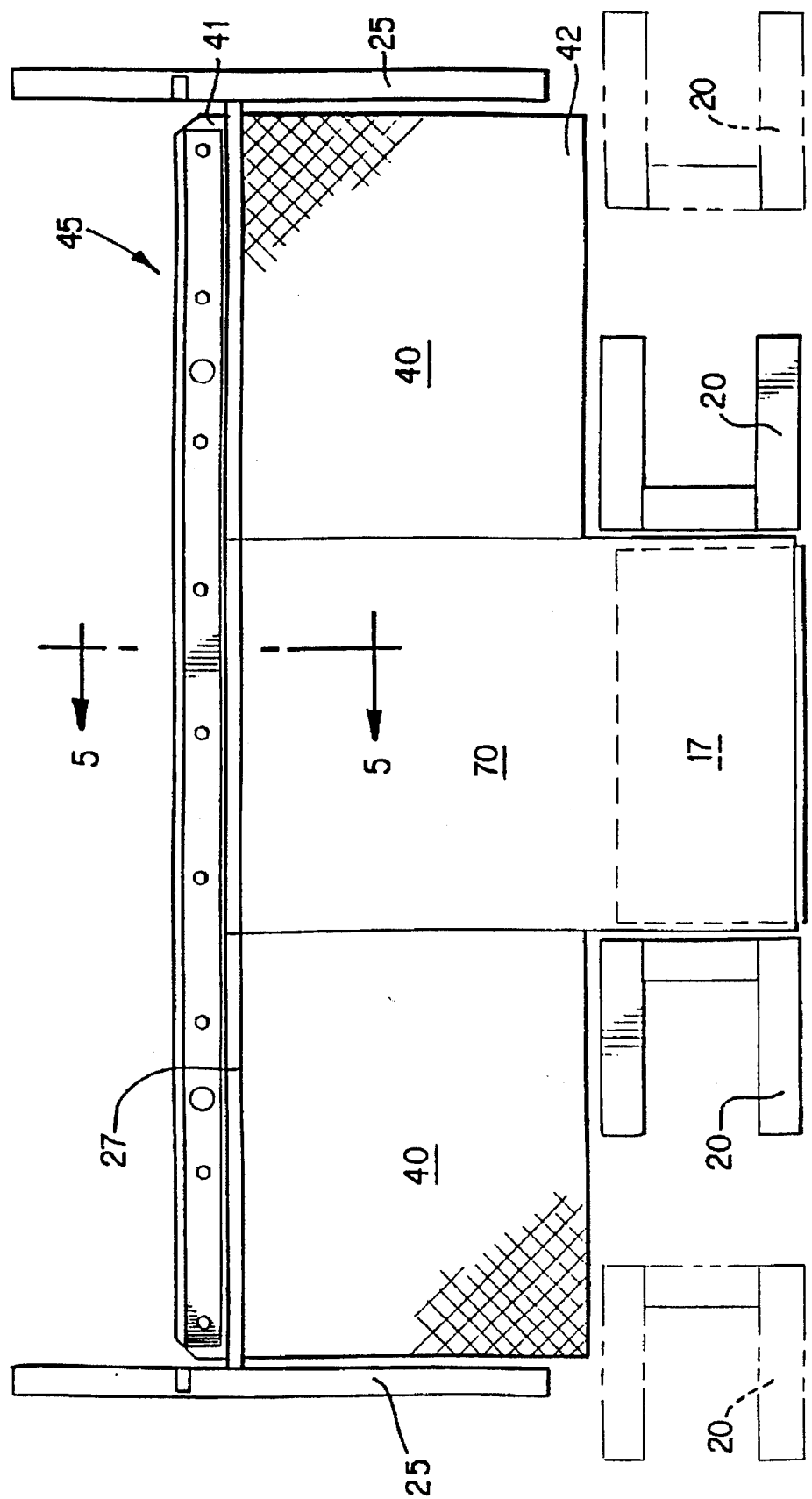
FIG. 11 is a front view of a fixed woven mesh metal curtain with a slave woven mesh metal curtain mounted adjacent to the fixed woven mesh metal curtain, according to one preferred embodiment of this invention.

As shown in FIGS. 11–13, each moveable guide arm 20 translates between an innermost position shown by the solid lines and an outermost position shown by the phantom lines. Thus, as moveable guide arm 20 and mover bracket 21 move to the left as shown in FIG. 12, moveable woven mesh metal curtain 50 follows such movement to the left. Likewise, as shown in FIG. 13, as moveable guide arm 20 and mover bracket 21 move to the right, moveable woven mesh metal curtain 50 also moves to the right.

Figure 16:
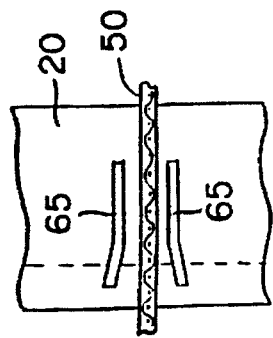
FIG. 16 is a top sectional view taken along line 16—16, as shown in FIG. 15.
Figure 15:
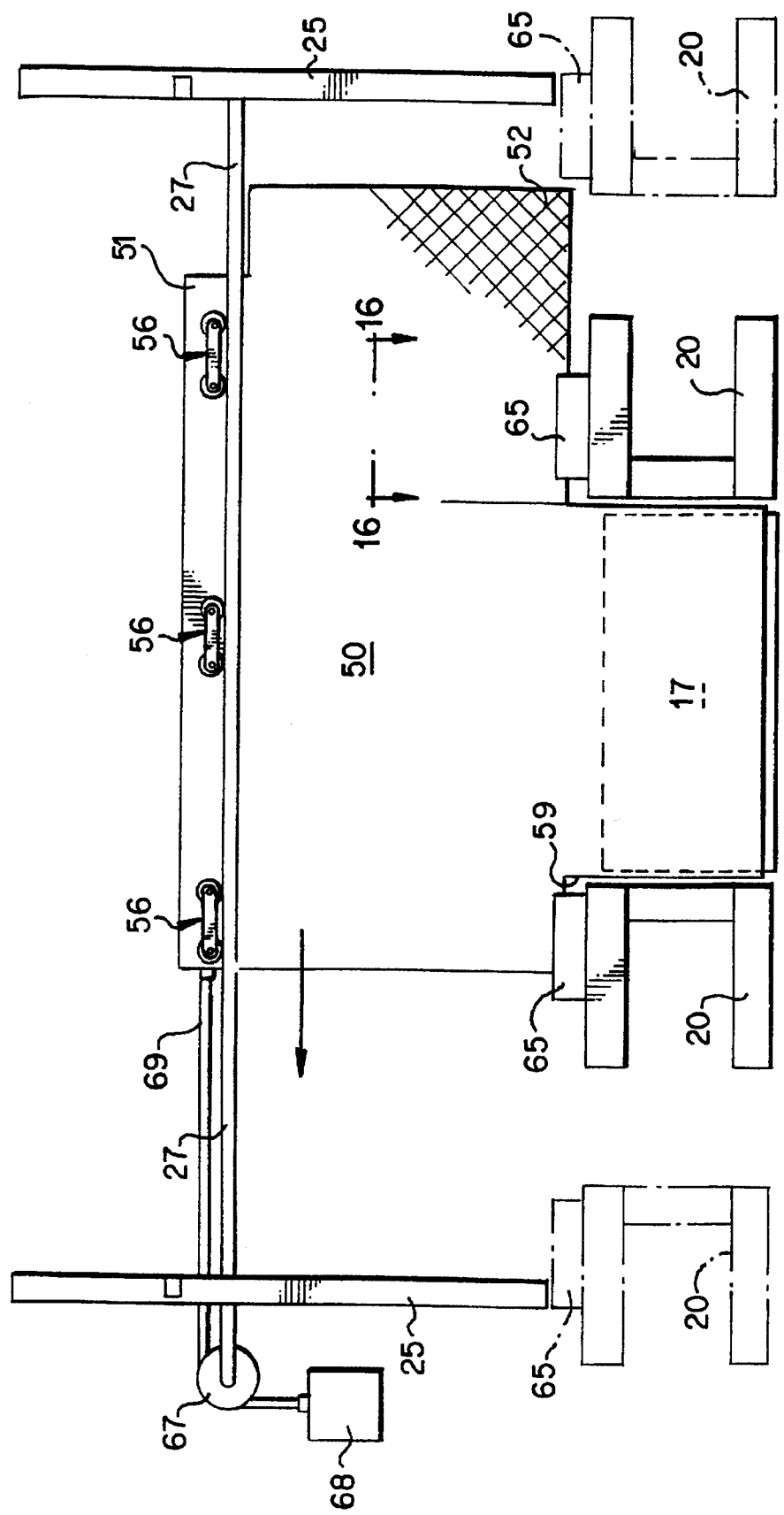
FIG. 15 is a front view of a moveable woven mesh metal curtain detachably mounted within receiver brackets which are fixed with respect to a moveable guide arm.

According to another preferred embodiment of this invention, each moveable woven mesh metal curtain 50 can translate or move along the longitudinal axis of slot 29, 29' without moveable woven mesh metal curtain 50 being attached or otherwise secured to or with respect to moveable guide arm 20. As shown in FIGS. 15 and 16, receiver bracket 65 is secured to moveable guide arm 20. It is apparent that receiver bracket 65 can be welded, bolted, or otherwise secured to or with respect to moveable guide arm 20 in any suitable manner known to those skilled in the art. As best shown in FIG. 16, receiver bracket 65 guides moveable woven mesh metal curtain 50 as it moves.

Pulley 67 is secured with respect to hood 25. One end of cable 69 is secured to top portion 51 of moveable woven mesh metal curtain 50, as shown in FIG. 15. The opposite end of cable 69 is secured to weight 68. As shown in FIG. 15, with the system comprising pulley 67, weight 68 and cable 69, moveable woven mesh metal curtain 50 is urged in the direction of the solid arrow shown in FIG. 15. Thus, edge portion 59 of moveable woven mesh metal curtain 50 normally contacts moveable guide arm 20. As moveable guide arm 20 moves, moveable woven mesh metal curtain 50 automatically follows guide arm 20 in the direction of the solid arrow shown in FIG. 15, due to weight 68 moving downward and cable 69 drawing moveable woven mesh metal curtain 50.

As shown in FIGS. 15 and 16, moveable woven mesh metal curtain 50 is positioned between and guided by two receiver brackets 65. Thus in such preferred embodiment of this invention, it is not necessary to attach or otherwise secure moveable woven mesh metal curtain 50 with respect to guide arm 20. It is possible to strengthen edge portion 59 of moveable woven mesh metal curtain 50, such as by attaching a strengthening bracket to the woven mesh metal material. However, in most applications, the strength and rigidity of the material of moveable woven mesh metal curtain 50 is sufficient when contacting guide arm 20.

According to the embodiment shown in FIG. 15, there is a direct relationship between the distance that weight 68 travels and the distance that moveable woven mesh metal curtain 50 correspondingly travels. However, it is apparent that more elaborate gear mechanisms or other motion transfer mechanisms can be used to translate a distance that weight 68 moves into more or less of a distance that moveable woven mesh metal curtain 50 moves.

Because one preferred embodiment of this invention incorporates multiple rows of fixed woven mesh metal curtains 40 and moveable woven mesh metal curtains 50, it is possible to effectively prevent water and scale from discharging through the front opening of hood 25.

Mill stock 17 is shown in dashed lines in FIGS. 2 and 11–13. It is apparent that as the width of mill stock 17 is varied, moveable guide arms 20 are positioned between both extreme positions and moveable woven mesh metal curtains 50 effectively stop scale pieces from discharging through the front of hood 25.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. In a milling apparatus having a guide arm which guides mill stock, and a top plate having an opening, a woven mesh metal curtain apparatus comprising: a mounting plate, a fixed woven mesh metal curtain, a bracket secured with respect to a top portion of said fixed woven mesh metal curtain, said bracket secured with respect to said mounting plate, in a mounted position of said fixed woven mesh metal curtain within the milling apparatus said mounting plate removably covering at least a portion of said opening.

2. A curtain apparatus according to claim 1 wherein said bracket comprises an elongated angle bracket having a first side attached to said top portion of said fixed woven mesh metal curtain and a second side secured with respect to said mounting plate.

3. A curtain apparatus according to claim 1 further comprising lifting means for positioning said fixed woven mesh metal curtain into and out of said opening.

4. A curtain apparatus according to claim 3 wherein said lifting means comprise a lifting lug secured with respect to said mounting plate.

5. A curtain apparatus according to claim 1 wherein the top plate is of a hood that is removably attached to the milling apparatus.

6. A curtain apparatus according to claim 1 further comprising: a moveable woven mesh metal curtain, mounting means for mounting said moveable woven mesh metal curtain within one of said opening and another opening in an adjustable operating position with respect to said top plate, and movement means for moving said moveable woven metal mesh curtain upon movement of the guide arm.

7. A curtain apparatus according to claim 6 wherein said mounting means comprise a roller assembly secured to an upper portion of said moveable woven mesh metal curtain, said roller assembly comprising a rotatable wheel making rolling contact on at least one of the top plate and the mounting plate.

8. A curtain apparatus according to claim 6 wherein the top plate is of a hood that is removably attached to the milling apparatus.

9. A curtain apparatus according to claim 6 wherein said movement means comprise an elongated flexible member having one end attached to said moveable woven mesh metal curtain and an opposite end attached to bias means for urging said moveable woven mesh metal curtain against the guide arm.

10. A curtain apparatus according to claim 9 wherein said flexible member comprises a cable, a pulley is mounted with respect to said top plate, and said cable is routed over said pulley.

11. A curtain apparatus according to claim 9 wherein said bias means comprise a weight and said weight is suspended by said elongated member.

* * * * *